United States Patent
Oroskar et al.

(10) Patent No.: US 9,413,435 B1
(45) Date of Patent: Aug. 9, 2016

(54) UPLINK COMP MODE SELECTION BASED ON PROCESSING LOAD OF NEIGHBOR

(71) Applicant: Sprint Spectrum L.P., Overland Park, KS (US)

(72) Inventors: Siddharth S. Oroskar, Overland Park, KS (US); Maulik K. Shah, Overland Park, KS (US); Jasinder P. Singh, Olathe, KS (US)

(73) Assignee: Sprint Spectrum, L.P., Overland Park, KS (US)

( * ) Notice: Subject to any disclaimer, the term of this patent is extended or adjusted under 35 U.S.C. 154(b) by 85 days.

(21) Appl. No.: 14/325,206

(22) Filed: Jul. 7, 2014

(51) Int. Cl.
*H04W 4/00* (2009.01)
*H04B 7/02* (2006.01)

(52) U.S. Cl.
CPC ...................................... *H04B 7/024* (2013.01)

(58) Field of Classification Search
CPC ........................................................ H04B 7/024
See application file for complete search history.

(56) References Cited

U.S. PATENT DOCUMENTS

| 8,798,021 | B2 * | 8/2014 | Mangalvedhe | H04W 24/02 370/338 |
| 2012/0184322 | A1 * | 7/2012 | Falconetti | H04W 28/18 455/524 |
| 2013/0017852 | A1 * | 1/2013 | Liu | H04W 88/085 455/509 |
| 2013/0258890 | A1 * | 10/2013 | Li | H04W 24/02 370/252 |

FOREIGN PATENT DOCUMENTS

WO        2014/062104        4/2014

* cited by examiner

*Primary Examiner* — Clemence Han (57) ABSTRACT

Embodiments disclosed herein may be implemented by a first access node in an access network, such as by an eNodeB in an LTE network, in order to determine an uplink coordinated multipoint (CoMP) mode for one or more other access nodes with which the given access node is coordinating. An example method involves: (a) determining, by a first access node, a central processing unit (CPU) load of a second access node, (b) based at least in part on the CPU load of the second access node, the first access node selecting a coordinated multipoint (CoMP) mode from a plurality of CoMP modes, and (c) sending a CoMP-mode message from the first access node, wherein the CoMP-mode message instructs the second access node to use the selected CoMP mode.

15 Claims, 6 Drawing Sheets

UPLINK COMP MODE SELECTION BASED ON PROCESSING LOAD OF NEIGHBOR

BACKGROUND

Many people use mobile stations, such as cell phones, personal digital assistants (PDAs), tablet computers, laptop computers, desktop computers, in-car computers, and so on, to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1×RTT networks" (or "1× networks" for short), which stands for "Single Carrier Radio Transmission Technology." These networks typically provide communication services such as voice, Short Message Service (SMS) messaging, and packet-data communication.

Mobile stations typically conduct these wireless communications with one or more base transceiver stations (BTSs), each of which send communications to and receive communications from mobile stations over the air interface. Each BTS is in turn communicatively connected with an entity known as a base station controller (BSC), which (a) controls one or more BTSs and (b) acts as a conduit between the BTS(s) and one or more switches or gateways, such as a mobile switching center (MSC) and/or packet data serving node (PDSN), which may in turn interface with one or more signaling and/or transport networks.

As such, mobile stations can typically communicate with one or more endpoints over the one or more signaling and/or transport networks from inside one or more coverage areas (such as cells and/or sectors) of one or more BTSs, via the BTS(s), a BSC, and an MSC and/or PDSN. In typical arrangements, MSCs interface with the public switched telephone network (PSTN), while PDSNs interface with one or more core packet-data networks and/or the Internet. To meet increasing demand for high-speed data on mobile devices, cellular service providers have begun implementing "4G" networks, which provide service under one or more 4G air interface protocols, such a long-term evolution (LTE) protocol. LTE was developed by the $3^{rd}$ Generation Partnership Project (3GPP), and is based on GSM/EDGE and UMTS/HSPA network technology.

In the context of LTE, a mobile station is typically referred to as a "user entity" (UE), and may take various mobile and stationary forms, such as a mobile phone, tablet computer, laptop computer, desktop computer, or any other device configured for wireless communication. Herein, the terms "mobile station," "wireless communication device" (or WCD), and "user entity" (or UE) may be used interchangeably.

OVERVIEW

In cellular radio access networks, such as a Long Term Evolution (LTE) network, reception at cell edges may be problematic for various reasons. For example, the greater distance to a base station at a cell edge may result in lower signal strength. Further, at a cell edge, interference levels from neighboring cells are likely to be higher, as the wireless communication device is generally closer to neighboring cells when at a cell edge.

To help improve the quality of service at cell edges, 3GPP LTE-A Release 11 introduced a number of Coordinated Multipoint (CoMP) schemes. By implementing such CoMP schemes, a group or cluster of base stations may improve service at cell edges by coordinating transmission and/or reception in an effort to avoid inter-cell interference, and in some cases, to convert inter-cell interference into a usable signal that actually improves the quality of service that is provided.

LTE-A Release 11 defined a number of different CoMP schemes or modes for both the uplink (UL) and the downlink (DL). On the downlink, two basic types of CoMP modes are set forth: joint processing (JP) schemes and coordinated scheduling/beamforming (CSCH or DL-CSCH) schemes. On the uplink numerous types of CoMP modes have been devised.

Uplink CoMP modes may involve interference rejection combining (IRC) or coordinated scheduling for purposes of reducing or preventing interference between transmissions from different user entities (UEs). Additionally or alternatively, various uplink CoMP modes may involve "joint reception." Joint reception generally involves multiple base stations receiving a signal that is transmitted by a given UE, and sending the respectively received signals or a decoded and/or processed version of the respectively received signals to one another, or to a master base station, such that the multiple received versions of the UE's transmission can be combined to improve reception and/or reduce interference.

Various types of joint reception have been implemented on the uplink. For example, joint reception on the uplink can be centralized. When a centralized joint reception mode is implemented on the uplink, the coordinating base stations simply pass the received signal from a given UE on to a master base station, which then uses the received signals from multiple base stations to decode and/or process the signal from the given UE. Joint reception on the uplink can also be decentralized. Specifically, when a decentralized joint reception mode is implemented on the uplink, a coordinating base station may decode and/or process the received signal from a given UE, and then send the decoded and/or processed signal from the given UE to the master base station. The master base station can then combine or select from the decoded and/or processed versions of the UE's transmission, which are sent to the master base station from one or more coordinating base stations that receive the UE's signal (and possibly a version of the UE's signal that is received at the master base station itself).

Due to the decoding and/or further processing that is involved, decentralized joint processing may increase the processing demands that CoMP places on a coordinating base station (i.e., on the base station that sends a received signal to a master base station), as compared to the lesser processing demands that typically result from centralized joint processing. Accordingly, some embodiments may help to manage the processor load at such coordinating base stations by dynamically changing CoMP modes based on the processor load at the coordinating base stations. In particular, the master base station may monitor the processor load at a coordinating base station, and switch between a centralized and one or more decentralized uplink CoMP modes in an effort to manage the processor load of the coordinating base station.

In a further aspect, when implementing different uplink CoMP modes, there may be a tradeoff between the processing demands placed on a coordinating base station (i.e., on the base station that sends a received signal to a master base station), and demands placed on the backhaul links between base stations, which are used to send received signals between base stations. Specifically, while decentralized joint processing may increase the processing demands placed on a coordinating base station, decoding the received signal may also reduce the size of the signal that is sent to the master base station via a backhaul link. Accordingly, some embodiments may help to manage both the processor load(s) at coordinating base station(s) and the loads on backhaul links by dynamically changing CoMP modes based on both the processor load at the coordinating base stations and loads (e.g., traffic levels or bandwidth usage) over backhaul links between coordinating and master base stations.

In an embodiment, a method involves a first access node: (a) determining a central processing unit (CPU) load of a second access node, wherein the first access node and the second access node provide service in a radio access network, (b) based at least in part on the CPU load of the second access node, the first access node selecting a coordinated multipoint (CoMP) mode from a plurality of CoMP modes, and (c) sending a CoMP-mode message from the first access node, wherein the CoMP-mode message instructs the second access node to use the selected CoMP mode.

In another embodiment, an access node includes at least one processor, a non-transitory computer readable medium, and program instructions stored on the non-transitory computer readable medium and executable by the at least one processor. The program instructions are executable by the at least one processor to: (a) determine a central processing unit (CPU) load of a second access node, wherein the access node and the second access node provide service in a radio access network, (b) based at least in part on the CPU load of the second access node, select a coordinated multipoint (CoMP) mode from a plurality of CoMP modes, and (c) send a CoMP-mode message to the second access node, wherein the CoMP-mode message instructs the second access node to use the selected CoMP mode.

In an additional embodiment, a non-transitory computer-readable medium has stored thereon program instructions that, upon execution by a computing system of a first access node, cause the computing system to perform operations comprising: (a) determining a central processing unit (CPU) load of a second access node, wherein the first access node and the second access node provide service in a radio access network, (b) based at least in part on the CPU load of the second access node, the first access node selecting a coordinated multipoint (CoMP) mode from a plurality of CoMP modes, and (c) sending a CoMP-mode message from the first access node, wherein the CoMP-mode message instructs the second access node to use the selected CoMP mode.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

I. Exemplary Network Architecture

Figure 1:
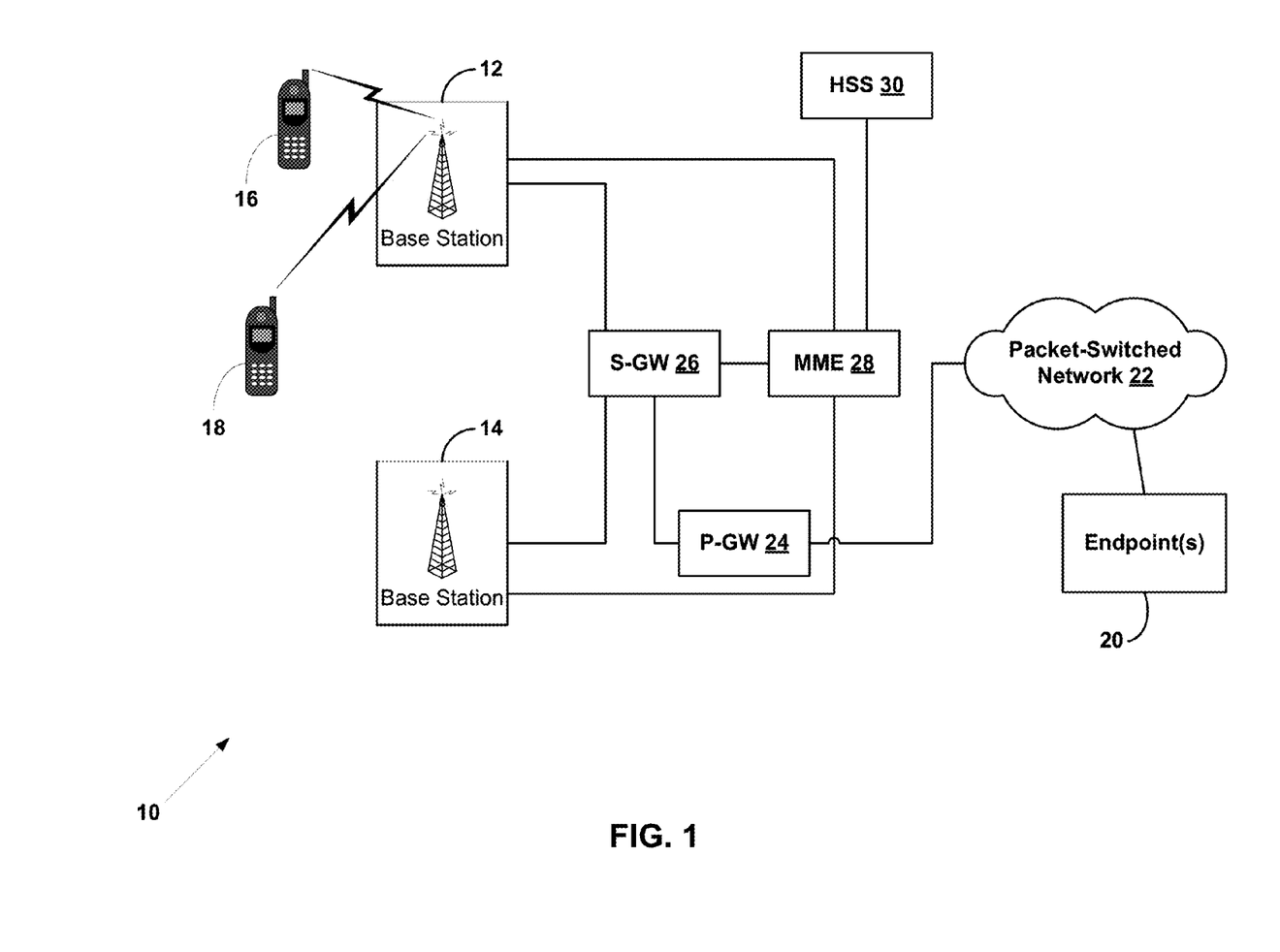
FIG. 1 is a simplified block diagram of a wireless telecommunications network, according to an exemplary embodiment.

FIG. 1 is a simplified block diagram of a wireless telecommunications network 10 in which exemplary embodiments may be employed. For purposes of illustration, FIG. 1 shows a network architecture that may be used in an LTE system. It is to be understood, however, that other network architectures could be used. For instance, an exemplary embodiment may implemented in conjunction with access networks where service is provided under one or more other air interface protocols, such as Code Division Multiple Access (CDMA) protocols (e.g., 1×RTT, 1×EV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, and infrared protocols, among other possibilities.

Wireless telecommunications network 10 may include a plurality of wireless access points, which are exemplified in FIG. 1 by base stations 12 and 14. Note that a wireless telecommunications network may also be referred to herein as a radio access network (RAN). In LTE terminology, base stations 12 and 14 may each correspond to an eNodeB, and thus may also be referred to as eNodeBs 12 and 14. Base stations 12 and 14 may each include a wireless coverage area within which the base station is able to wirelessly communicate with user devices, which may also be referred to as a cell, a sector, or a cell-sector. The wireless coverage areas of base stations 12 and 14 could be either overlapping or non-overlapping. Alternatively, the wireless coverage areas of base stations 12 and 14 could be co-extensive, or one wireless coverage area could be encompassed within another. Each wireless coverage area may correspond to a cell. A cell may, in turn, be subdivided into smaller wireless coverage areas, such as sectors. Although FIG. 1 shows wireless telecommunications network 10 with two base stations, it is to be understood that network 10 may include a greater or fewer number of base stations.

For purposes of illustration, base station 12 is shown in wireless communication with user devices 16 and 18, which may also be referred to as user entities (UEs) 16 and 18. User devices 16 and 18 could be wireless telephones, wireless e-mail devices, wirelessly-equipped computers (such as handheld, tablet, or laptop computers), or other types of wireless communication devices. In an exemplary embodiment, the wireless communications between base station 12 and user devices 16 and 18 involve OFDM signals on the downlink (communications transmitted from the base station to a user device) and on the uplink (communications from a user device to the base station). Although FIG. 1 shows base station 12 serving two user devices, it is to be understood that a base station may serve a greater or fewer number of user devices at a particular point in time.

User devices 16 and 18 could be engaged in communication sessions with one or more endpoints(s) 20 via base station 12. Endpoint(s) 20 may include, for example, one or more voice-over-packet (VoP) communication devices, e-mail servers, messaging servers, streaming media servers, gaming servers, and/or Web servers. In an exemplary embodiment, endpoint(s) 20 are communicatively coupled to a packet-switched network 22. Thus, a communication session between a user device and endpoint(s) 20 may involve the exchange of packets containing voice, video, text, or other data.

To support user devices' communications through packet-switched network 22, wireless telecommunications network 10 may include a packet gateway (P-GW) 24. For example, P-GW 24 may allocate Internet Protocol (IP) addresses for user devices. P-GW 24 may exchange packets with base stations 12 and 14 via a serving gateway (S-GW) 26. S-GW 26 may also serve as an anchor point for communication sessions when user devices move between base stations. Wireless telecommunications network 10 may also include one or more control nodes that control communications involving user devices, such as user devices 16 and 18. For example, network 10 may include a mobility management entity (MME) 28, which controls communications between user devices and S-GW 26. MME 28 may, in turn, be communicatively coupled to a home subscriber server (HSS) 30, which stores subscriber information.

Under LTE, UEs 16 and 18 may operate in one of three possible states, LTE_DETACHED, LTE_IDLE, and LTE_ACTIVE. A UE 16 or 18 typically operates in the LTE_DETACHED state while it is searching for and registering with the network. A UE 16 or 18 typically operates in the LTE_ACTIVE state once it has registered with the network and has a radio resource control (RRC) connection with an eNodeB (e.g., while actively engaged in a communication). Further, a UE 16 or 18 typically operates in the LTE_IDLE state when it is registered, but is not engaged in a communication, and thus does not have an RRC connection.

II. Coordinated Multipoint

As noted above, a network such wireless telecommunications network 10 may implement various types of coordinated multipoint (CoMP), which may specify various techniques by which base stations may coordinate to improve uplink and/or downlink service. Note that CoMP schemes designed for coordinated transmission by base stations may be referred to as downlink CoMP modes, while CoMP schemes designed for coordinated reception may be referred to as uplink CoMP modes.

Figure 2:
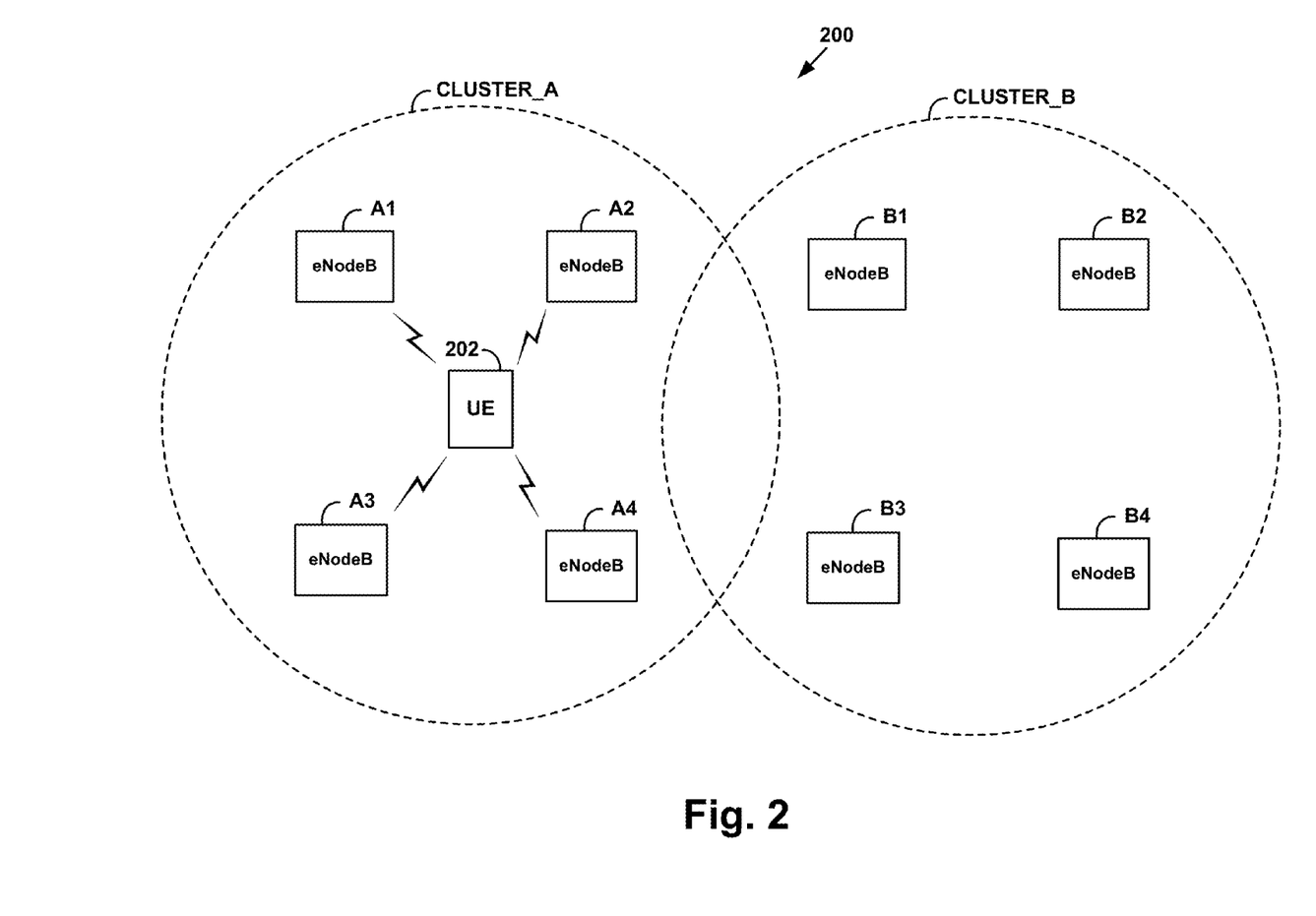
FIG. 2 is a simplified block diagram illustrating a network arrangement in which coordinated multipoint schemes may be implemented, according to an exemplary embodiment.

FIG. 2 is a simplified block diagram illustrating a network arrangement in which CoMP schemes may be implemented. In particular, FIG. 2 shows a portion of an LTE network 200, which includes base stations A1 to A4 and B1 to B4. Further, a UE 202 is operating in the coverage area of LTE network 200.

In order to implement CoMP, a backhaul network may be provided. The backhaul network may allow for communications between base stations and/or other network components. For example, in an LTE network, eNodeBs may communicate via links that are referred to as X2 interfaces. X2 is described generally in Technical Specification ETSI TS 136 420 for LTE; Evolved Universal Terrestrial Radio Access Network (E-UTRAN); X2 general aspects and principles. It should be understood, however, that other types of backhaul communications are also possible.

Further, in order to implement various CoMP schemes, base stations A1 to A4 and B1 to B4 may be grouped into clusters, where the base stations in each cluster coordinate according to whichever CoMP scheme is implemented at a given point in time. In the illustrated scenario, there are two clusters: (i) cluster_A, which includes eNodeBs A1 to A4, and (ii) cluster_B, which includes eNodeBs B1 to B4. Further, in the illustrated scenario, UE 202 is being served by the eNodeBs A1 to A4 in cluster_A. Note that the clusters, such as cluster_A and cluster_B, may be predetermined and static. Alternatively, the LTE network may dynamically and intelligently update the clustering of base stations in an effort to improve service.

In a further aspect, to facilitate some CoMP schemes, a master base station may be specified for each cluster. The master base station in a cluster may take the lead to coordinate various functions between the base stations in the cluster. For example, eNodeB A1 may function as the master base station (or master eNodeB) in cluster_A, and eNodeB B1 may function as the master base station in cluster_B. Other examples are also possible. Further, the non-master base stations may be referred to herein as coordinating base stations or as neighbor base stations to the master base station.

Various types of uplink CoMP modes are possible. Further, as explained below, different uplink CoMP modes may have differing effects on the CPU load of the master base station and/or on the CPU load(s) at the other base station(s) with which the master base station coordinates to implement uplink CoMP. As will also be explained below, the uplink CoMP modes may additionally or alternatively have different effects on the backhaul network.

An interference rejection combining (IRC) mode may be used to reduce or cancel interference at a receiving base station (e.g., the master eNodeB in a cluster). When only IRC is implemented, there is very little coordination required between base stations. Therefore IRC-only does not significantly increase the CPU load at a coordinating base station, or increase the load on the backhaul network (e.g., on X2 links between base stations).

Some uplink CoMP may use joint scheduling (also referred to as coordinated scheduling) in order to, e.g., reduce interference. When joint scheduling is implemented, only one UE at a time transmits the physical uplink shared channel (PUSCH) on a given resource block (RB), and the base stations coordinate to schedule the transmission. If only joint scheduling, then the load on the backhaul network (e.g., X2 links between base stations) may be reduced significantly, because joint scheduling typically only requires that base stations exchange scheduling data.

When joint reception is implemented, multiple UEs can simultaneously transmit on the PUSCH, and may use the same RB when doing so. The PUSCHs may be received by multiple eNodeBs, and combined using various techniques, such as a mean squared error (MMSE) or zero forcing (ZF) process. Joint reception may be combined with other types of uplink CoMP techniques, such as IRC, adaptive antennas, and/or multi-user detection schemes, in an effort to further improve performance and/or for other reasons.

CoMP modes that include joint processing may be centralized or decentralized to varying degrees. Specifically, the extent to which a coordinating base station decodes and/or processes a received signal, before sending to the master base station, may vary in different CoMP modes. Since different CoMP modes can increase or decrease in the amount of decoding and/or processing that is done by the coordinating base station, different CoMP modes can in turn increase or decrease the CPU load of the coordinating base station, respectively. Further, increasing the amount of decoding and/or processing that is performed by the coordinating base station may result in less data that is transferred over the backhaul network (e.g., over an X2 link) to the master base station. Specifically, less data may be transferred because, e.g., the size of the decoded signal may be less than the size of the received signal.

As an example, a first type of joint processing may involve a coordinating eNodeB sending the master eNodeB the received signal via an X2 interface, without having decoded the received signal. Specifically, coordinating eNodeB may send raw I/Q data to the master eNodeB via an X2 interface between these two eNodeBs. The raw I/Q data may include all the physical layer bits received by the eNodeB. This first type of joint processing may be referred to herein as "centralized" joint processing.

A second type of joint processing may involve a coordinating eNodeB decoding a received signal before sending it to the master eNodeB. For example, the decoding process may involve the coordinating eNodeB may extracting user data (e.g., packet data) from the physical layer bits in the received signal, such as by removing phase information represented by I/Q bits in the received signal, and/or removing other non-user data from the received signal. The master eNodeB may then compare the decoded signal received from the coordinating eNodeB to its own decoded signal (and possibly decoded signals received from other coordinating eNodeBs) and select the best decoded signal. Alternatively, the master eNodeB may combine the decoded signal from a UE that is received from a coordinating eNodeB with its own the decoded signal from the UE, and/or with one or more other versions of the decoded signal from the UE that are received from other coordinating eNodeBs, in order to generate a combined signal for the particular UE.

This second type of joint processing may be referred to herein as "decentralized" joint processing. It should be understood that varying degrees of decentralized joint processing are possible. That is, the amount of decoding and processing may vary. For example, decentralized joint processing could simply involve decoding the received signal before sending it to the master base station. However, joint processing could further involve compressing the decoded signal before sending it to the master base station (which could help to reduce the load on the backhaul links). Other examples are also possible.

As noted above, decentralized joint processing may reduce the size of the received signal before it is sent to the master base station. Therefore, while decentralized joint processing may increase the CPU load at the coordinating base stations, it can decrease the load on the backhaul link between the coordinating base station and the master base station.

III. Exemplary Ran Components

Figure 3:
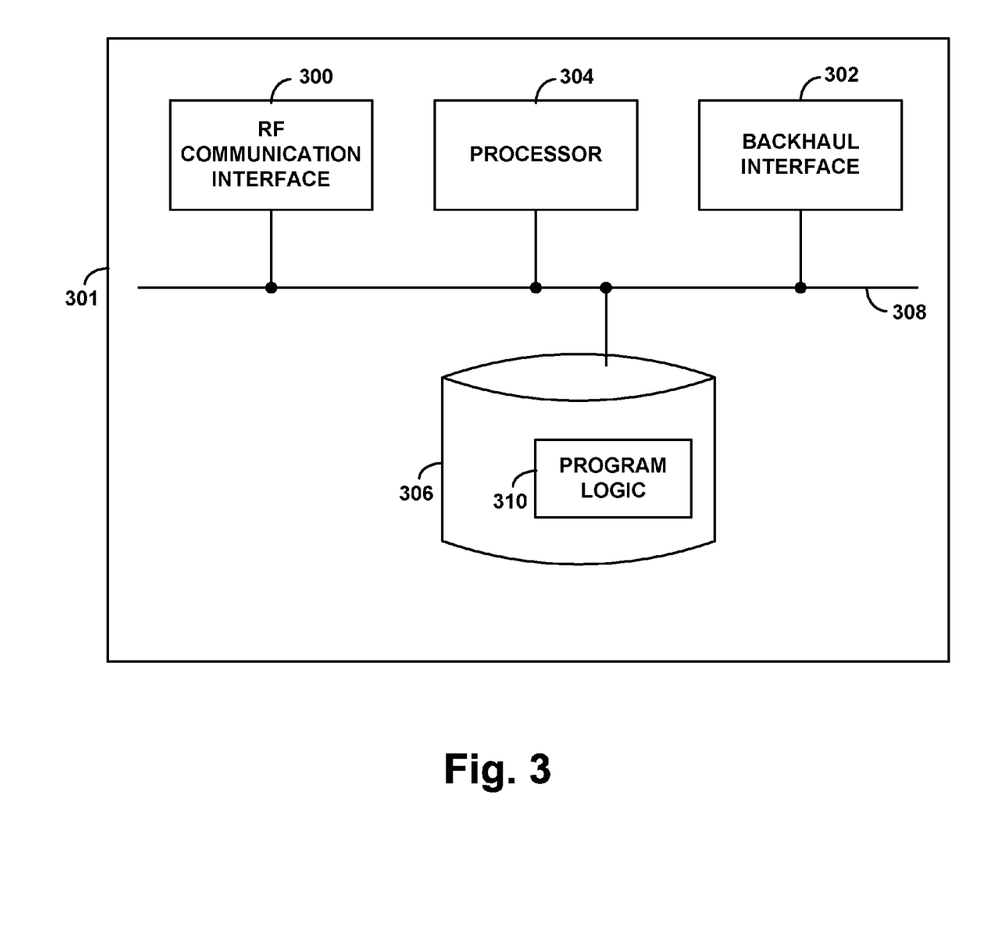
FIG. 3 is a simplified block diagram illustrating a component of a radio access network, according to an exemplary embodiment.

FIG. 3 is a simplified block diagram illustrating a RAN component, according to an exemplary embodiment. More specifically, FIG. 3 illustrates some of the functional components that would likely be found in a RAN component 301 arranged to operate in accordance with the embodiments herein. As shown, the RAN component 301 may include an RF communication interface 300, a backhaul interface 302, a processor 304, and data storage 306, all of which may be communicatively linked together by a system bus, network, or one or more other connection mechanisms 308. Further, the RAN component 301 may be, for example, an eNodeB, a S-GW, an MME, a BTS, BSC, BTS/BSC combination, and/or an MSC, among other possibilities.

An exemplary system could be implemented as part of or within a RAN component 301, could take the form of such a RAN component itself, or might include two or more of such RAN components (e.g., the eNodeBs in a cluster, and possibly a S-GW and/or MME). Accordingly, the illustrated components of RAN component 301 (e.g., communication interface 300, a backhaul interface 302, a processor 304, and data storage 306) may be distributed and/or subdivided between two or more RAN components, or may be implemented in a single RAN component.

In RAN component 301, RF communication interface 300 may comprise one or more antenna structures, one or more power amplifiers, and associated equipment, for engaging in RF communication with mobile stations operating within the base station's coverage, according to one of the air-interface protocols noted above for instance. Backhaul interface 302 may comprise any sort of communication link or mechanism enabling the base station to exchange signaling and bearer data with other RAN entities, such as with MSC 52 for instance. Processor 304 may comprise one or more processors (e.g., general purpose and/or special purpose processors), such as microprocessors for instance.

Data storage 306 may be a non-transitory computer readable medium. For example, data storage 306 may take the form of one or more volatile and/or non-volatile storage components, such as magnetic, optical, or organic storage components, integrated in whole or in part with processor 304.

As further shown, data storage 306 contains program logic 310 (e.g., machine language instructions) executable by processor 304 to carry out various functions, such as the functionality of the exemplary methods and systems described herein. In an exemplary embodiment, data storage 306 may include program instructions that are executable by processor 304 to provide the various processes of a RAN and components thereof that are described herein.

Referring back to FIG. 2, eNodeBs A1 to A4 and B1 to B4 may be configured in the same or similar manner as RAN component 301. As such, a RAN component 301 may be configured as a master eNodeB that selects CoMP modes for a coordinating (e.g., neighboring) eNodeB based at least in part on the CPU load at the coordinating eNodeB and/or the load on the backhaul link between the master eNodeB and coordinating eNodeB. A RAN component 301 may additionally or alternatively be configured as a coordinating (e.g., neighboring) eNodeB in such an arrangement.

IV. Exemplary Methods

Figure 4A:
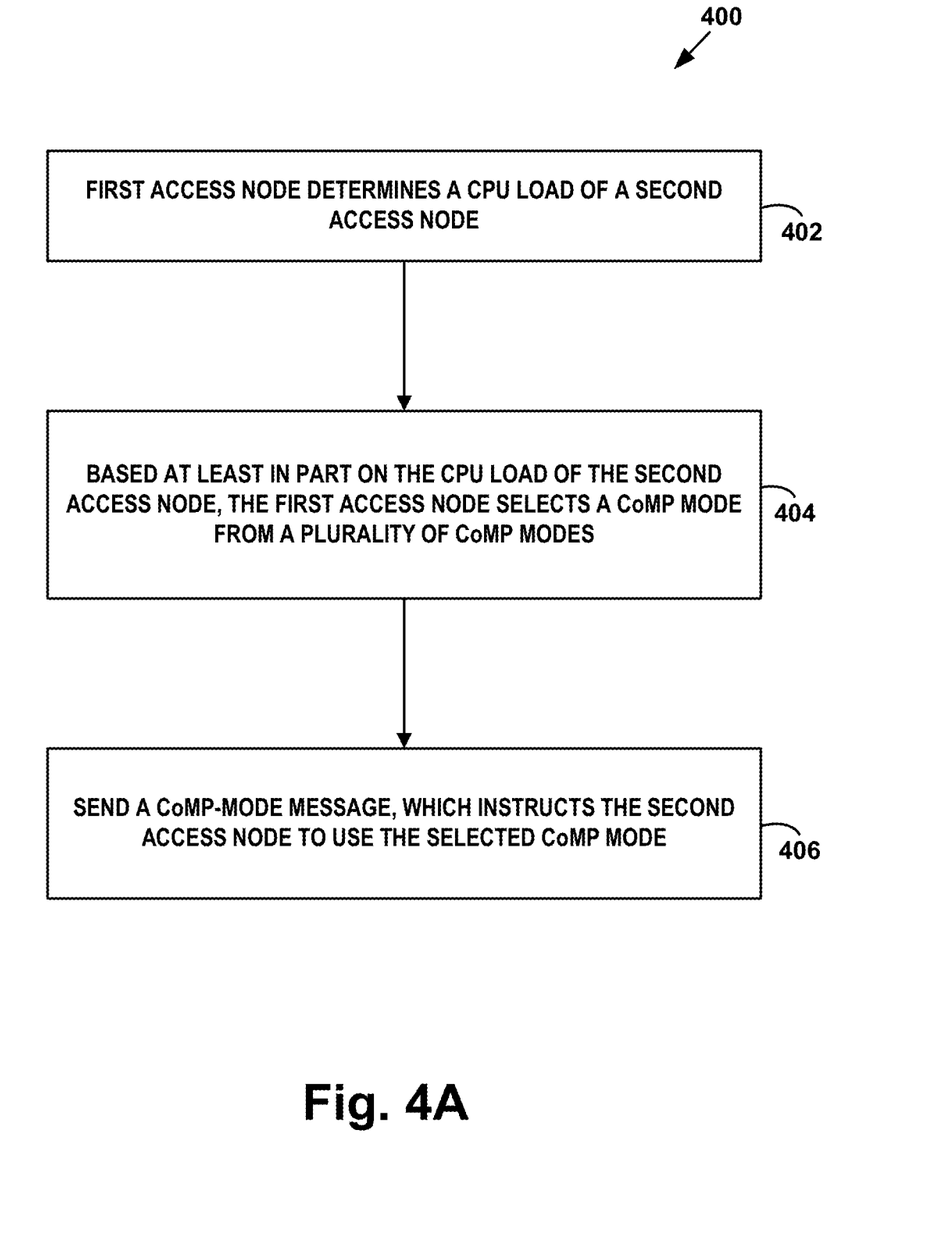
FIG. 4A is a flow chart illustrating a method, according to an exemplary embodiment.

FIG. 4A is a flow chart illustrating a method 400, according to an exemplary embodiment. In an exemplary embodiment, method 400 may be carried out by an access node in a radio network. For instance, in an exemplary implementation, method 400 may be carried out by an eNodeB that is configured for two or more different types of uplink CoMP modes, or a system or combination of systems within such an eNodeB. Method 400 may also be carried out by other types entities, other combinations of entities, and/or by one or more subsystems within such other entities or combinations of such entities.

As shown by block 402, method 400 involves a first access node determining a central processing unit (CPU) load of a second access node. In an exemplary embodiment, the first access node and the second access node provide service in neighboring coverage areas in the radio access network (e.g., such as in an LTE network). Then, based at least in part on the CPU load of the second access node, the first access node may selecting a CoMP mode from a plurality of CoMP modes, as shown by block 404. In an exemplary embodiment, the first access node may select an uplink CoMP mode from a two or more possible uplink CoMP modes. Further, the access node may send a CoMP-mode message, which instructs the second access node to use the selected CoMP mode, as shown by block 406.

As noted above, the first access node and the second access node in method 400 may be a first eNodeB and a second eNodeB in an LTE network. Further, the first access node and the second access node provide service in neighboring coverage areas in the radio access network and/or in the same cluster within an LTE network. In some embodiments, the first access node, which implements method 400, may be the master base station (e.g., the master eNodeB) in a cluster of base stations that are configured for two or more uplink CoMP modes. More generally, in an exemplary embodiment, a first eNodeB and a second eNodeB may be considered neighbors if an X2 link, or another type of backhaul link, exists between the first eNodeB and the second eNodeB.

At block 402, the process of determining the CPU load of the second access node may involve the first access node receiving a load-indication message that indicates a current CPU load of the second access node. In an exemplary embodiment, the first access node may receive the load-indication message via an X2 link, or via another type of backhaul link. It is also possible for the first access node to receive the load-indication message via other types of communication channels.

Figure 4B:
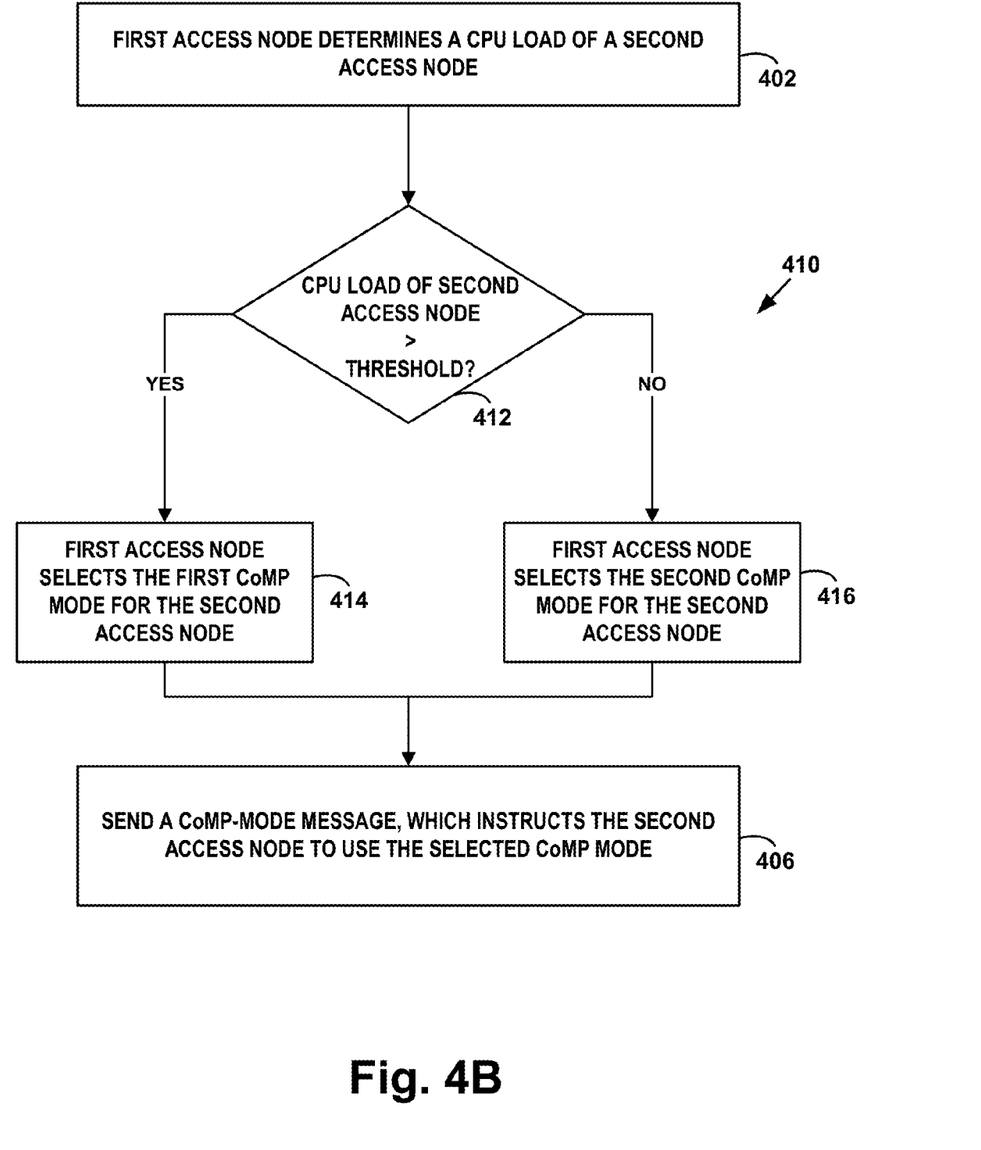
FIG. 4B is a flow chart illustrating a sub-method for selecting a coordinated multipoint mode, according to an exemplary embodiment.

At block 404, the first access node may use various techniques to select a particular CoMP mode for use by a second access node. (Note also that the first access node may also use the CoMP mode that it selects for the second access node.) For example, FIG. 4B is a flow chart illustrating a sub-method 410 for selecting a CoMP mode, according to an exemplary embodiment. Sub-method 410 may be implemented in embodiments where the available CoMP modes include at least a first CoMP mode and a second CoMP mode.

More specifically, as shown by block 412, the first access may determine whether or not the CPU load of the second access node is greater than a threshold. Then, if it is determined that the second access node's CPU load is greater than the threshold, the first access node may select the first CoMP mode, as shown by block 414. Otherwise, if it is determined that the second access node's CPU load is less than or equal to the threshold, then the first access node may select the second CoMP mode, as shown by block 416.

In an exemplary embodiment, the first CoMP mode, which is selected if the second access node's CPU load is greater than the threshold, may be centralized joint processing (e.g., where the second access node sends raw I/Q data to the first access node, without first decoding the received signal from a given UE). Alternatively, when the second access node's CPU load is less than the threshold, the first access node may select de-centralized joint processing (e.g., where the second access node decodes and/or processes a received signal from a given UE, before sending it to the first access node). Since the use of centralized joint processing will typically reduce the CPU load at the second access node that results from uplink CoMP, as compared to when decentralized joint processing is used, use of sub-method 410 may help to manage the CPU load of the second access node.

In some embodiments, when selecting a CoMP mode, the first access node may consider the X2 load between the first access node and the second access node, in addition to the second access node's CPU load. For instance, method 400 may further involve the first access node determining the X2 load between the first access node and the second access node, and using the X2 load as a further basis for selecting the CoMP mode from the plurality of CoMP modes.

Figure 4C:
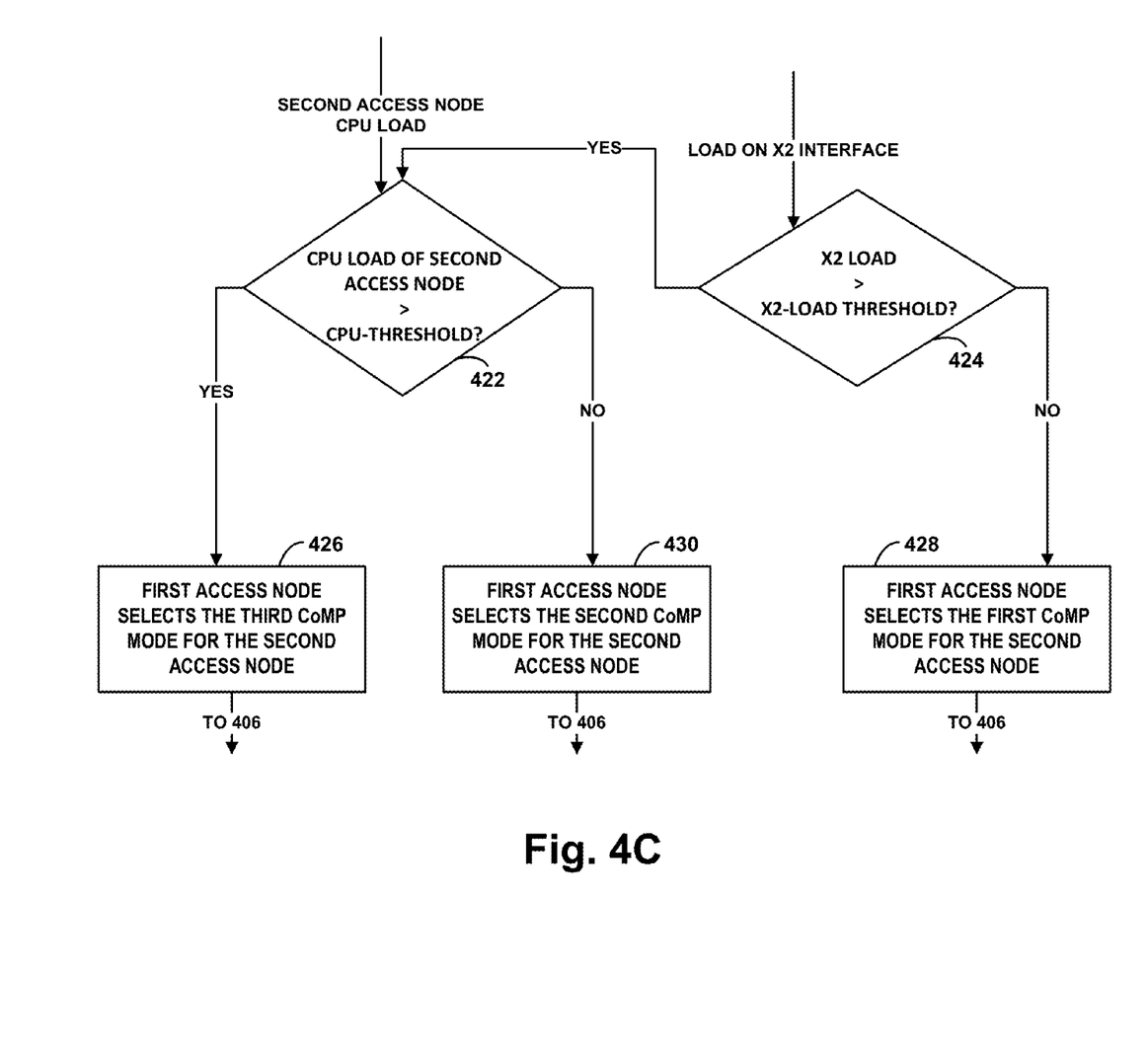
FIG. 4C is a flow chart illustrating a sub-method for selecting a coordinated multipoint mode for a second access node, based on both X2 load between the first and second access node and the processing load of the second access node, according to an exemplary embodiment.

FIG. 4C is a flow chart illustrating a sub-method 420 for selecting a CoMP mode for a second access node, based on both X2 load between the first and second access node and the CPU load of the second access node, according to an exemplary embodiment. Sub-method 420 may be implemented at, e.g., block 404 of method 400, in embodiments where the available CoMP modes include at least a first CoMP mode, a second CoMP mode, and a third CoMP mode.

More specifically, the first access node may determine whether or not the CPU load of the second access node is above a CPU-load threshold, as shown by block 422. The first access node may also determine whether or not the X2 load between the first access node and the second access node is greater than an X2-load threshold, as shown by block 424.

If it is determined that the CPU load is greater than the CPU-load threshold, and that the X2 load is above the X2-load threshold, the first access node may select the third CoMP mode for use by the second access node, as shown by block 426. If it is determined that the X2 load is less than or equal to the X2-load threshold, then the first access node may select the first CoMP mode for use by the second access node, regardless of what the CPU load of the second access node is, as shown by block 428. Further, if it is determined that the CPU load is less than or equal to the CPU-load threshold, and that the X2 load is greater than the X2-load threshold, then the first access node may select the second CoMP mode for use by the second access node, as shown by block 430.

As noted above, in the particular embodiment shown in FIG. 4C, when the X2 load is less than or equal to the X2-load threshold, the first CoMP mode may be selected regardless of what the CPU load of the second access node is. Thus, as suggested by the flow of arrows in FIG. 4C, block 422 (and possibly block 402 of method 400) may not be carried out unless it is first determined that the X2 load is greater than the X2-load threshold.

However, in other embodiments, blocks 422 and 424 may both be carried out each time method 420 is performed (e.g., each time method 400 is used to select a CoMP mode). For example, if four or more uplink CoMP modes are available, then the first access node may select one of four different CoMP modes, depending upon which of the four combined states is determined by the combination of blocks 422 and 424 (e.g., (CPU load high, X2 load high), (CPU load high, X2 load low), (CPU load low, X2 load high), and (CPU load low, X2 load low)). Other examples are also possible.

In an exemplary embodiment, the first CoMP mode include or take the form of centralized joint processing, the second CoMP mode may involve decentralized joint processing, and the third CoMP mode may be, e.g., coordinated scheduling or IRC-only. In such an embodiment, implementation of method 420 by the first access node results in: (i) IRC-only or coordinated scheduling being selected when the CPU load on the second access node and the X2 load between the first and second access nodes being are both higher, (ii) a decentralized joint processing mode being selected when the second access node's CPU load is lower and the X2 load is higher, and (iii) centralized joint processing being selected when the X2 load is lower (regardless of what the CPU load of the second access node is). Note that this embodiment prioritizes the load on the backhaul network (e.g., on the X2 interface) over the CPU load of the second access node. In other embodiments, the CPU load of the second access node may be prioritized over the load on the backhaul network, which in turn may change the particular uplink CoMP modes that are selected in different scenarios.

Further, in some embodiments, the first access node may repeat method 400 for two or more other access nodes, such that an uplink CoMP mode can be selected for each of the two or more other access nodes. For instance, a first access node having two or more neighboring access nodes (e.g., access nodes that serve neighboring coverage areas), may determine the respective CPU load at each of some or all of its neighboring access nodes. The first access node may then select a CoMP mode for each neighboring access node based on the neighboring access node's respective CPU load.

Alternatively, the first access node may analyze an aggregate measure of CPU load (e.g., an average CPU load) for the neighboring access nodes, and use the aggregate measure of CPU load to determine a single CoMP mode that should be used by all of the neighboring access nodes. As a specific example, a master eNodeB in a cluster of eNodeBs may determine an average CPU load for the eNodeBs in the cluster. (Note that the first access node may or may not include its own CPU load when determining the average CPU load.) Then, based at least in part on the average CPU load for the cluster, the master eNodeB may select a particular uplink CoMP mode for use by some or all of the eNodeBs in the cluster, and send a CoMP-mode message indicating the selected uplink CoMP mode to some or all of the eNodeBs in the cluster. Other examples are also possible.

V. Conclusion

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

The invention claimed is:

1. A method comprising:
   determining, by a first access node, a central processing unit (CPU) load of a second access node, wherein the first access node and the second access node provide service in a radio access network;
   based at least in part on the CPU load of the second access node, the first access node selecting a coordinated multipoint (CoMP) mode from a plurality of CoMP modes, wherein the plurality of CoMP modes comprises a first CoMP mode utilizing centralized joint processing and a second CoMP mode utilizing decentralized joint processing, and wherein selecting the CoMP mode comprises:
      (a) determining whether or not the CPU load of the second access node is greater than a threshold;
      (b) if it is determined that the CPU load of the second access node is greater than the threshold, then selecting the first CoMP mode utilizing centralized joint processing, wherein the centralized joint processing; and
      (c) if it is determined that the CPU load of the second access node is less than or equal to the threshold, then selecting the second CoMP mode utilizing decentralized joint processing, wherein the decentralized joint processing comprises a coordinating access node decoding a received signal before sending it to a master access node, and the master access node comparing the decoded signal received from the coordinating access node to its own decoded signal; and
   sending a CoMP-mode message from the first access node, wherein the CoMP-mode message instructs the second access node to use the selected CoMP mode.

2. The method of claim 1, wherein the first access node and the second access node comprise a first eNodeB and a second eNodeB in a Long Term Evolution (LTE) network.

3. The method of claim 1, wherein the plurality of CoMP modes comprise a plurality of uplink CoMP modes.

4. The method of claim 1, wherein determining the CPU load of the second access node comprises the first access node receiving a load-indication message that indicates a current CPU load of the second access node.

5. The method of claim 1, further comprising:
   determining, by the first access node, a load on a backhaul link between the first access node and the second access node; and
   using the determined load on the backhaul link as a further basis for selecting the CoMP mode from the plurality of CoMP modes.

6. The method of claim 1, further comprising:
   determining a respective CPU load for each of one or more additional second access nodes; and
   using the CPU load of the second access node and the respective CPU loads of the one or more additional second access nodes as a basis for selecting the CoMP mode from the plurality of CoMP modes;
   wherein the CoMP-mode message further instructs the one or more additional second access nodes to use the selected CoMP mode.

7. The method of claim 6, wherein using the CPU load of the second access node and the respective CPU loads of the one or more additional second access nodes as a basis for selecting the CoMP mode comprises:
   determining an average CPU load across the second access node and the one or more additional second access nodes; and
   using the average CPU load as a basis for selecting the CoMP mode.

8. The method of claim 1, further comprising, for each of one more additional second access nodes of:
   determining, by the first access node, a CPU load of the additional second access node;
   based at least in part on the CPU load of the second access node, the first access node selecting a coordinated multipoint (CoMP) mode from a plurality of CoMP modes, for use by the additional second access node; and
   sending a CoMP-mode message from the first access node, wherein the CoMP-mode message instructs the additional second access node to use the CoMP mode selected for use by the additional second access node.

9. A method comprising:
   determining, by a first access node, a central processing unit (CPU) load of a second access node, wherein the first access node and the second access node provide service in a radio access network;
   determining, by the first access node, an X2 load on an X2 interface between the first access node and the second access node;
   based at least in part on both the CPU load the second access node the X2 load, the first access node selecting a coordinated multipoint (CoMP) mode from a plurality of CoMP modes, wherein the plurality of CoMP modes comprises at least a first uplink CoMP mode, a second uplink CoMP mode, and a third uplink CoMP mode, and wherein selecting a CoMP mode from the plurality of CoMP modes comprises:

(a) determining whether or not the CPU load of the second access node is above a CPU-load threshold;

(b) determining whether or not the X2 load between the first access node and the second access node is greater than an X2-load threshold;

(c) if it is determined that the CPU load is greater than the CPU-load threshold and that the X2 load is above the X2-load threshold, then selecting the third uplink CoMP mode;

(d) if it is determined that the CPU load is greater than the CPU-load threshold and that the X2 load is less than or equal to the X2-load threshold, then selecting the first uplink CoMP mode;

(e) if it is determined that the CPU load is less than or equal to the CPU-load threshold and that the X2 load is greater than the X2-load threshold, then selecting the second uplink CoMP mode; and (f) if it is determined that the CPU load is less than or equal to the CPU-load threshold and that the X2 load is less than or equal to the X2-load threshold, then selecting the first uplink CoMP mode; and sending a CoMP-mode message from the first access node, wherein the CoMP-mode message instructs the second access node to use the selected CoMP mode.

10. The method of claim 9, wherein the first uplink CoMP mode comprises centralized joint processing, and wherein the second uplink CoMP mode comprises decentralized joint processing.

11. The method of claim 10, wherein the third uplink CoMP mode comprises IRC-only or joint scheduling.

12. An access node comprising:
at least one processor;
a non-transitory computer readable medium; and
program instructions stored on the non-transitory computer readable medium and executable by the at least one processor to:
determine a central processing unit (CPU) load of a second access node, wherein the access node and the second access node provide service in a radio access network;
based at least in part on the CPU load of the second access node, select a coordinated multipoint (CoMP) mode from a plurality of CoMP modes, wherein the plurality of CoMP modes comprises a first CoMP mode utilizing centralized joint processing and a second CoMP mode utilizing decentralized joint processing, and wherein selection the CoMP mode comprises: (a) determining whether or not the CPU load of the second access node is greater than a threshold, (b) if it is determined that the CPU load of the second access node is greater than the threshold, then selecting the first CoMP mode utilizing centralized joint processing; and (c) if it is determined that the CPU load of the second access node is less than or equal to the threshold, then selecting the second CoMP mode utilizing decentralized joint processing, wherein the decentralized joint processing comprises a coordinating access node decoding a received signal before sending it to a master access node, and the master access node comparing the decoded signal received from the coordinating access node to its own decoded signal; and send a CoMP-mode message to the second access node, wherein the CoMP-mode message instructs the second access node to use the selected CoMP mode.

13. The access node of claim 12, wherein the program instructions further comprise program instructions that are executable by the at least one processor to:
determine an X2 load between the first access node and the second access node; and
use the X2 load as a further basis to select the CoMP mode from the plurality of CoMP modes.

14. A non-transitory computer-readable medium having stored thereon program instructions that, upon execution by a computing system of a first access node, cause the computing system to perform operations comprising:
determining a central processing unit (CPU) load of a second access node, wherein the first access node and the second access node provide service in a radio access network;
based at least in part on the CPU load of the second access node, selecting a coordinated multipoint (CoMP) mode from a plurality of CoMP modes for use by the second access node, wherein the plurality of CoMP modes comprises a first CoMP mode utilizing centralized joint processing and a second CoMP mode utilizing decentralized joint processing, and wherein selecting the CoMP mode comprises: (a) determining whether or not the CPU load of the second access node is greater than a threshold; (b) if it is determined that the CPU load of the second access node is greater than the threshold, then selecting the first CoMP mode utilizing centralized joint processing; and (c) if it is determined that the CPU load of the second access node is less than or equal to the threshold, then selecting the second CoMP mode utilizing decentralized joint processing, wherein the decentralized joint processing comprises a coordinating access node decoding a received signal before sending it to a master access node, and the master access node comparing the decoded signal received from the coordinating access node to its own decoded signal; and
sending a CoMP-mode message from the first access node, wherein the CoMP-mode message instructs the second access node to use the selected CoMP mode.

15. The non-transitory computer-readable medium of claim 14, further comprising program instructions that, upon execution by the computing system of the first access node, cause the computing system to perform operations comprising:
determining an X2 load on an X2 interface between the first access node and the second access node; and
using the X2 load as a further basis for selecting the CoMP mode from the plurality of CoMP modes.

\* \* \* \* \*